US007146600B2

(12) United States Patent
Zook

(10) Patent No.: US 7,146,600 B2
(45) Date of Patent: Dec. 5, 2006

(54) METHOD AND APPARATUS FOR DERIVING MULTIPLE TEST SOURCE FILES FROM ONE SOURCE FILE

(75) Inventor: Nathan Howard Zook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 10/339,772

(22) Filed: Jan. 9, 2003

(65) Prior Publication Data

US 2004/0139425 A1   Jul. 15, 2004

(51) Int. Cl.
*G09F 9/44* (2006.01)
(52) U.S. Cl. ............... 717/106; 717/115; 717/140
(58) Field of Classification Search ......... 717/106–158
See application file for complete search history.

(56) References Cited

U.S. PATENT DOCUMENTS

| | | | | |
|---|---|---|---|---|
| 5,748,961 A | * | 5/1998 | Hanna et al. | 717/145 |
| 6,094,528 A | * | 7/2000 | Jordan | 717/115 |
| 2003/0005421 A1 | * | 1/2003 | Prakash et al. | 717/152 |

* cited by examiner

*Primary Examiner*—Kakali Chaki
*Assistant Examiner*—Mark P. Francis
(74) *Attorney, Agent, or Firm*—Carr LLP; Diana R. Gerhardt

(57) ABSTRACT

A method, computer program code, and system directs a complying build tool, such as Make or GNUmake, to derive multiple final files from a single source file, along with any associated auxiliary files. The invention further provides a method to minimize the work of a user of the invention when changing the list of final files to be derived, and provides guards against the possibility of builds being executed with stale data.

15 Claims, 2 Drawing Sheets

METHOD AND APPARATUS FOR DERIVING MULTIPLE TEST SOURCE FILES FROM ONE SOURCE FILE

BACKGROUND OF THE INVENTION

1. Field of the Invention

The invention relates generally to a software build tool and, more particularly, to a make utility functioning in conjunction with a makefile.

2. Description of the Related Art

Generally, businesses that develop software follow a definite method. The program is first written in some human-readable source code. This source code is then processed by various programs to produce an executable, which a computer can run. These processing programs generally produce intermediate files, as well as the final executable. The executable is then tested and, based on the results of this test, the original code is then modified. This cycle continues until no more modification is required.

For all but the smallest programs, the source code is broken up into several pieces, called files. Usually, these files fall into two categories: source files and header files. Header files contain information that the processing tools use to ensure that intermediate files can be properly merged into the final executable. The source files are processed in parallel. Source files contain the actual source code that the processing programs use, which forms the bulk of the intermediate files. Generally, one of each type of intermediate file is generated per source file.

Source files are quasi-independent, and can often be modified independently of other source files, or in limited combination. However, each change in a piece of code typically requires some amount of reprocessing and retesting. A build tool, usually a computer program such as Make or GNUMake, is often used to control the processing of these source files. These build programs generally automate the series of commands used to process the source files and also determine if a file requires reprocessing at all. This is usually done under the control of one or more configuration/program files, called "Makefiles." Makefiles describe how and when various targets must be updated or "built." Targets are built by executing a series of commands contained in the makefile. A "target" is the basic object in a makefile. Most targets correspond to files. Many targets have dependencies, which are targets that cause the original target to be built if the dependencies are updated or have been modified.

Generally, the history of a file—what it was at various points during the development cycle—is of use primarily if something is broken. Also, there are usually two types of changes in the software code: bug fixes and feature enhancements/additions.

However, software designed to test some other software or function is developed differently. In addition to bug fixes and feature enhancements/additions, another type of change is the creation of an entirely new test. A new test may be created through the change of as little as one character in the source code. Merely copying the source code and making the change to create the new test is unacceptable, because any bug fixes or changes subsequently made to the original source code will need to be propagated to the new file, as well. Therefore, what is needed is a method to create multiple intermediate files, which can then be processed into multiple executable files, from a master source file so that any bug fixes or feature enhancements will only have to be made once.

SUMMARY OF THE INVENTION

The present invention provides a method, computer program code, and system for constructing a makefile for a complying build tool from a core makefile and other files to direct a plurality of final files to be built from a single source file. A list of rules files is obtained. Each rules file corresponds to one of the plurality of final files. A list corresponding to the plurality of final files is derived from the list of rules files. It is required that the makefile be rebuilt if the list corresponding to the plurality of final files has changed since the makefile was last built. The makefile depends upon the rules files and the core makefile. Rules specific to each corresponding final file are derived from the rules files, and the rules are included in the makefile. Each final file is directed to be built by calling a file processing tool with option(s) specific to each final file. It is determined whether files containing dependency information for the final files are available. Upon a determination that the files containing dependency information for the final files are available, the files containing dependency information for the final files are included, and the dependency information is reported by the file processing tool. It is ensured that any given final file will be considered out-of-date if there is no dependency information available for the given final file. The files containing the dependency information are regenerated only if the corresponding final file is being made.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
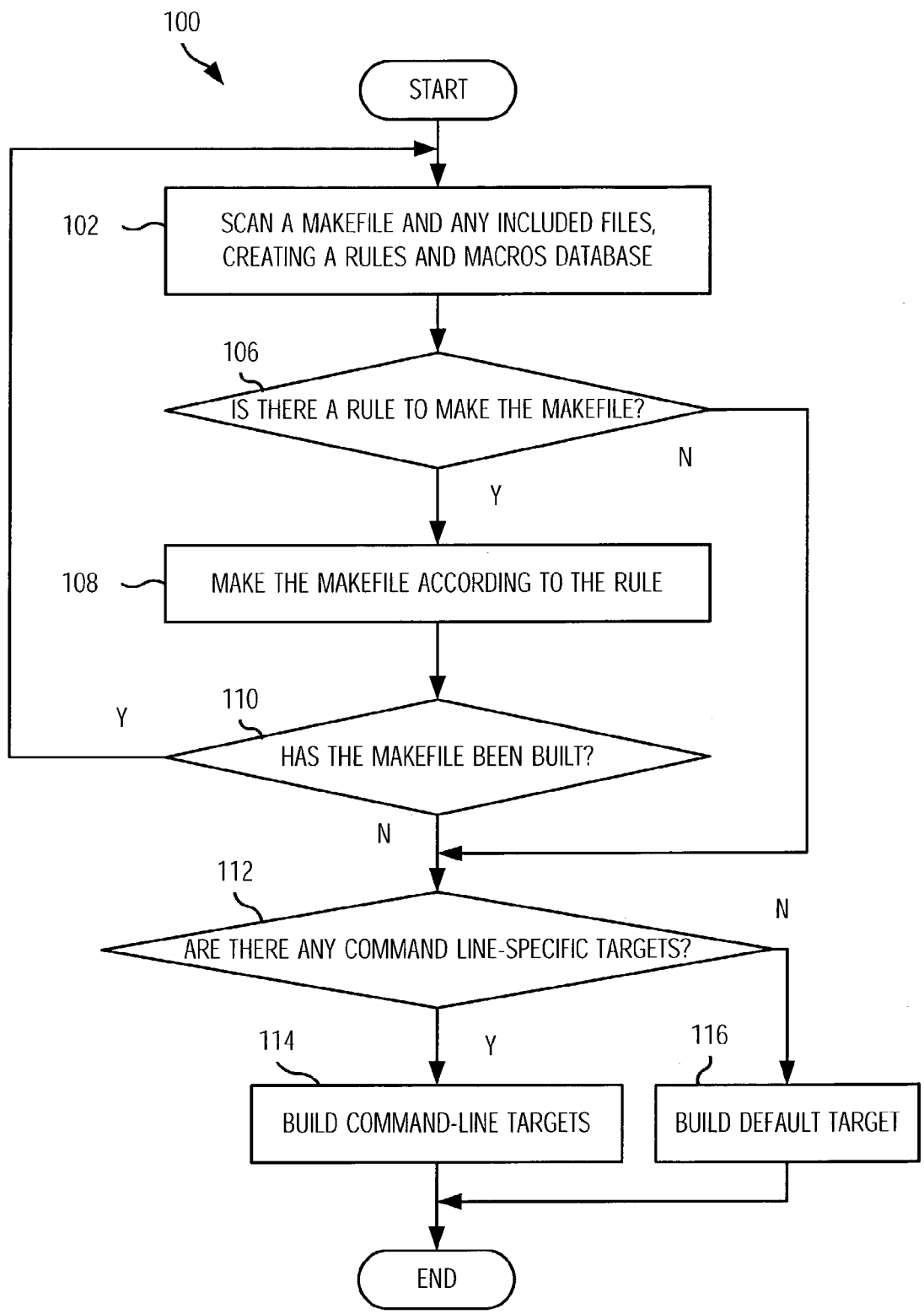
FIG. 1 is a high-level block diagram of the function of a complying build tool.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Those skilled in the art should appreciate that computer instructions can be written in a number of programming or script languages for use with many computer architectures or operating systems, although the illustrative software samples depicted below utilize GNUMake, IBM's XLC cc, sh, m4, and perl. Likewise, the particular names of the files used in this invention are immaterial to the invention, and merely serve for illustrative purposes. Additionally, for the most part, details concerning programming standards and the like have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a processor such as a computer or electronic data processor in accordance with code such as computer program code, software, or integrated circuits that are coded to perform such functions.

In addition to the following discussion and description, details of the present invention are further described and disclosed in an Appendix, entitled "Makefile Program," which is attached herewith and hereby incorporated by reference.

The present invention, accordingly, provides a method and apparatus for controlling the creation and updating of multiple final files ("final," in this case, is only in reference to the present invention; in practice, such files will often be intermediate files), along with any associated auxiliary files, from a single source file. To this end, a rules file is constructed for each final file, containing the specifications particular to the creation of each final file. Some part of the name of the final file forms the stem of the name for the associated rules files, and of the names of the various variables set within the rules files. These variable names are themselves configured so that the user of the invention need merely copy a rules file to initiate the creation of a new final file. The invention also prevents the build tool from erroneously building or rebuilding targets with out-of-date rules.

The present invention relies upon certain features of the build tool and of the file processing programs. A build tool that supplies these features will be called a "complying build tool." A program or arrangement of programs that supplies the necessary features to process files according to this invention will be called a "complying processing tool." The example illustrated herein uses GNUmake as a complying build tool and an arrangement of a POSIX-compliant m4 and IBM's XLC cc preprocessor as a complying processing tool.

A complying build tool complies with the IEEE Std 1003.1-2001 (POSIX) requirements for make, as well as providing certain extensions (a subset of the GNU extensions) to the standard, and is directed in its operations by a makefile and the command line.

A makefile may comprise four different types of components, which may be intermixed. The first component is a set of rules to direct the building of targets. These rules may be either "explicit," meaning that a target is specified by name, or "pattern," meaning that the rule specifies a pattern, and any target name that matches the pattern can be made by the rule. A rule specifies the target or pattern to be made, and may have an optional list of dependencies that relate to the pattern in a pattern rule. Only single-colon rules are used in the present invention. The second type of component that may comprise a makefile is a macro declaration. Macro declarations consist of the name of the macro followed by a "=", followed by the definition of the variable or macro. Many build tools also support "variables," which are macros whose values are determined when their assignment is made, usually distinguished by the use of ":=" in their assignment. It should be noted that the present invention is indifferent to the use of variables or macros. A complying build tool will support at least one of two extensions of macro or variable use. The tools must support either "computed macro names" or "target-specific macros." A "computed macro name" is a name that itself is the result of a macro expansion (${${x}_y}). A "target-specific macro" is a macro definition that applies only to particular targets. In GNUmake, target-specific macro declarations have the name of the target followed by a colon preceding the macro definition (target: macro=value).

The third type of component that may comprise a makefile is a function call. Functions behave like macros. A function is a subroutine within a program that returns a value. GNUmake has a number of built-in functions, including string and filename handlers, and system calls. A complying build tool will have functions capable of 1) returning a list of file names matching some pattern; 2) manipulating such a list or a like list by changing and removing suffixes, and of obtaining the non-suffix part; and 3) manipulating a character string by replacing a series of white spaces with a single standard character while removing leading and trailing white spaces, and by substituting one character for another throughout.

The fourth type of component that may comprise a makefile is a directive. Two classes of Make directives are employed by the present invention: "include" directive, which includes the text of another file as if it were part of the makefile; and "conditionals" directive, which only allow text to be read conditionally.

A complying build tool begins by reading in the makefile, as well as any included files by the makefile, building its database. All included files, as well as the makefile itself, are made. A target is made by first making all of the target's dependencies, and then executing the commands for the target ("building" the target) if the target is out of date. A target is out of date if any of the following conditions apply: 1) any of the target's dependencies were built; 2) the target is a dependency of the special target ".PHONY"; and 3) as required by the POSIX standard. If, as a result of making the makefile, the makefile is actually built, the complying build tool does a restart—it re-reads the makefile, building its database, and so forth. If the makefile does not need to be built, the build tool proceeds to build the command-line targets, or, if there are none, the default target. Makes and builds may occur asynchronously, and multiple targets can be made or built simultaneously, so long as a target's dependencies are all made before the target itself is built.

The present invention centers around a variable named "TARGETS," a list of stems of the rules files. The rules file contains a standard series of variable definitions. If this list has changed from the last invocation of the complying build tool, then the makefile is forced to be out of date. If not, then the makefile has as its dependencies the rules files and the core makefile, herein titled "makefile.in." The makefile is built by concatenating (via POSIX-compliant cat and echo functions) the following things together: 1) a variable declaration preserving the current value of TARGETS; 2) the core makefile.in; and 3) the rules files, modified by prepending the name of each file to all of the variable declarations declared therein. In this manner, a user is assured that the build of the final files are performed with current data.

A complying processing tool is one that permits macro expansions inside directives, and, if it supports file inclusion, can output a list of included files. To build the various final files, a complying processing tool is called with options appropriate to the final file being built. Some might be variables derived from the rules files ($*_M4_OPT, $*_CC_OPT). Some may be derived directly from the name of the final file ($(basename $*), $(suffix $(subst -,.,$*)). The second m4 call in this example is a post-processing of the file. Other implementations might well produce the final file directly. The dependency data is then adjusted to reflect the logical status of the files being built. In this example, IBM's XLC cc preprocessor outputs its information in a ".u" file suitable for direct inclusion in a makefile. The processing in the complying processing tool is limited to changing the target of the rules from "source.o" to the true target, and dropping the extraneous "source.C" dependency line. The details are implementation specific. The resulting ".d" dependency file is touched with the timestamp of the final file to prevent unnecessary builds. The final file has as its dependencies the original source file (source.m4), its rules file, its dependency file, and makefile.in, which contains the rules to build the final files themselves. If there were other auxiliary files associated with the creation of the final files, these might also require similar processing.

The dependency files are included in the makefile so long as any exist, but they are never "built" from the point of view of the complying build tool.

The final file has as dependencies the original source file, the .mk and .d files, makefile.in and whatever files that the complying compiling tool lists. As the .d file is touched with the timestamp of the final file, this dependency exists solely to force the building of the target if the .d file is unavailable. The usual method of updating dependency information is inferior because it forces all of the dependency files to be rebuilt every time the original source file changes.

FIG. 1 illustrates a high-level block diagram 100 of the function of a complying build tool.

In step 102, the complying build tool scans a makefile and any included files, creating a rules and macros database.

In step 106, it is determined whether there is a rule to make the makefile. If there is such a rule, the process goes to step 108. Otherwise, the process goes to step 112.

In step 108, the complying build tool makes the makefile according to the rule. In step 110, it is determined whether the makefile has been built. If in fact the makefile was built, the process goes back to step 102 and starts all over again. Otherwise, the process proceeds to step 112, wherein the complying build tool determines if there are any command line-specified targets. If so, these targets are made in step 114. If not, the default target is made in step 116.

Figure 2:
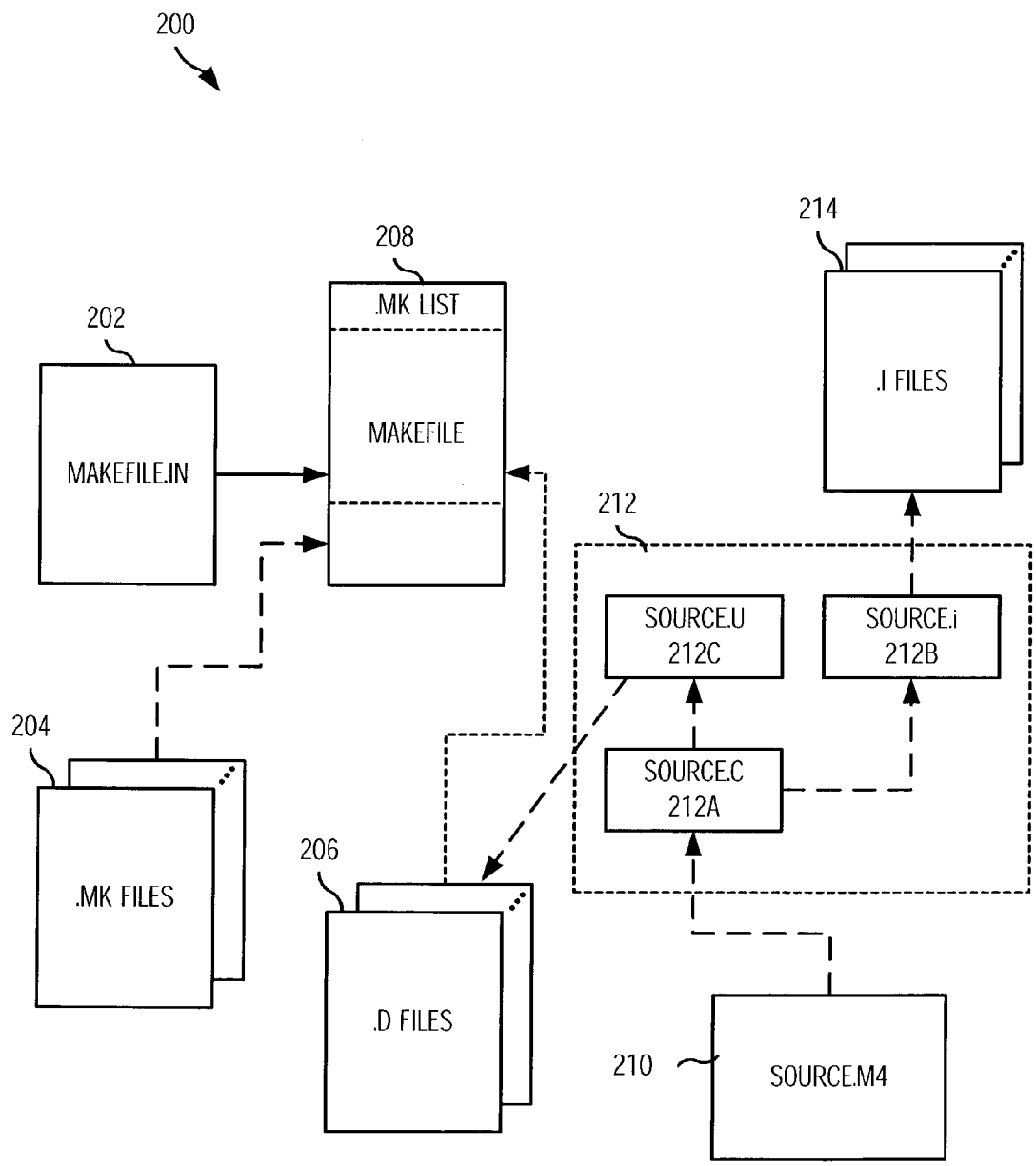
FIG. 2 is a block diagram showing the relationships between the various files utilized during a build.

Now referring to FIG. 2, a block diagram 200 depicts the relationships between the various files utilized during a build according to the present invention.

During the operation of a complying build tool (not shown) according to the present invention, the following files are used: a "makefile.in" file 202, one or more ".mk" files 204, one or more ".d" files 206, a makefile 208, a source file 210 (source.m4 in this example), various intermediate files 212, a and one or more final files 214 (.i files in this example).

The "makefile.in" file 202 is directly copied into the makefile 208. The ".mk" files 204 are processed and copied into the makefile 208. The ".d" files are included in the makefile 208 by a directive. The "source.m4" file 210 is the source file for the final files. The intermediate files 212 are produced by a complying processing tool. In this example, IBM's XLC cc preprocessor generates the "source.i" file 212B and the "source.u" file 212C from the "source.c" file 212A. The "source.i" file 212B is the main preprocessed output from processing the "source.c" file 212A. The "source.u" file 212C contains dependency information for the "source.i" file 212B processed to produce the ".d" file 206. The one or more final files 214 are the final output (.i files in this example, processed from the source.i file 212B).

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

APPENDIX

```
MAKEFILE.IN FILE
# Start of Makefile.in
TARGETS := $(strip $(basename $(wildcard *.mk)))
MKLIST := ${TARGETS :=.mk)
perl := /usr/bin/perl
.PRECIOUS : Makefile
.SUFFIXES :
ifneq (${OLDMKLIST}, ${MKLIST})
.PHONY : Makefile
endif
Makefile : Makefile.in ${MKLIST}
    echo >Makefile "OLDMKLIST := ${MKLIST}"
    cat >>Makefile Makefile.in
    if [ ! -z "${TARGETS}" ] ; then                \
        ${perl} -e '                               \
            while (<>) {                           \
                $$ARGV =~ s/\.mk// ;               \
                s/^/$$ARGV\_/ ;                    \
                print ;                            \
            } ;                                    \
        ' ${MKLIST} >>Makefile ;                   \
    fi
Makefile.in :
# This is the end code to build the Makefile
# Include the dependency files. (Since they aren't
# really
# needed until the build following the one during which
# they were made, this works)
DFILES = $(filter $(wildcard *.d),${TARGETS:=.d})
%.d :
ifneq (,$(strip ${DFILES}))
include ${DFILES}
endif
# End of include file stuff
%.i : source.m4 %.mk %.d Makefile.in
    set -e ; \
    ${M4} ${$*__M4_OPT} -Dtargname=$(basename $*) \
        -Dtarglvl=$(suffix $(subst -,.,$*)) $< \
            >source.C ; \
    ${CC} -M -P ${$*__CC_OPT} source.C ;           \
    ${M4} ${$*__M4_OPB} source.i >$*.i ;           \
    ${perl} -e '                                   \
        while (<>) {                               \
            s/source\.o: /$@ $*.d : / ;            \
            print unless /: source.C$$/;           \
        }; ' source.u >$*.d ;                      \
    touch -r $*.d $@
# END OF Makefile.in
TRASH-0.MK FILE
M4_OPT := -Dmain=trash.C
CC_OPT := -Dopt_a
M4_OPB := -Dm4_opt
TRASH-1.MK FILE
M4_OPT := -Dmain=trash.C
CC_OPT := -Dopt_b
M4_OPB := -Dm4_opt
RESULTING MAKEFILE
OLDMKLIST := trash-0.mk trash-1.mk
# Start of Makefile.in
TARGETS := $(strip $(basename $(wildcard *.mk)))
MKLIST := ${TARGETS:=.mk}
perl := /usr/bin/perl
.PRECIOUS : Makefile
.SUFFIXES :
ifneq (${OLDMKLIST}, ${MKLIST})
.PHONY : Makefile
endif
Makefile : Makefile.in $ {MKLIST}
    echo >Makefile "OLDMKLIST := ${MKLIST}"
    cat >>Makefile Makefile.in
    if [ ! -z "${TARGETS}" ] ; then                }
        ${perl} -e '                               \
            while (<>) {                           \
                $$ARGV =~ s/\.mk// ;               \
                s/^/$$ARGV\_/ ;                    \
                print ;                            \
```

-continued

```
        } ;                                                    \
    ' ${MKLIST} >>Makefile ;                                   \
    fi
Makefile.in :
# This is the end code to build the Makefile
# Include the dependency files. (Since they aren't really
# needed until the build following the one during which
# they were made, this works)
DFILES = $(filter $(wildcard *.d),${TARGETS:=.d})
%.d :
    ifneq (,$(strip ${DFILES}))
    include ${DFILES}
    endif
# End of include file stuff
%.i : source.m4 %.mk %.d Makefile.in
    set -e ; \
    ${M4} ${$*__M4__OPT} -Dtargname=$(basename $*)  \
        -Dtarglvl=$(suffix $(subst -,.,$*)) $< \
            >source.C ; \
    ${CC} -M -P ${$*__CC__OPT} source.C ;           \
    ${M4} ${$*__M4__OPB} source.i >$*.i ;           \
    ${perl} -e '                                    \
        while (<>) {                                \
            s/source\.o: /$@ $*.d : / ;             \
            print unless /: source.C$$/;            \
        }; ' source.u >$*.d ;                       \
    touch -r $*.d $@
# END OF Makefile.in
trash-0__M4__OPT := -Dmain=trash.C
trash-0__CC__OPT := -Dopt_a
trash-0__M4__OPB := -Dm4_opt
trash-1__M4__OPT := -Dmain=trash.C
trash-1__CC__OPT := -Dopt_b
trash-1__M4__OPB := -Dm4_opt
```

The invention claimed is:

1. A method for constructing a makefile for a complying build tool from a core makefile and other files to direct a plurality of final files to be built from a single source file, the method comprising the steps of:
    a) obtaining a list of rules files, each rules file corresponding to one of the plurality of final files;
    b) deriving from the list of rules files a list corresponding to the plurality of final files;
    c) requiring that the makefile be rebuilt if the list created in step b has changed since the makefile was last built;
    d) having the makefile depend upon the rules files and the core makefile;
    e) deriving from the rules files rules specific to each corresponding final file, and including the rules in the makefile;
    f) directing each final file to be built by calling a file processing tool with option(s) specific to each final file;
    g) determining whether files containing dependency information for the final files are available;
    h) upon a determination that the files containing dependency information for the final files are available, including the files containing dependency information for the final files, the dependency information being reported by the file processing tool;
    i) ensuring that any given final file will be considered out-of-date if there is no dependency information available for the given final file; and
    j) regenerating the files containing the dependency information only if the corresponding final file is being made.

2. The method of claim 1, wherein each rules file corresponds by name to one of the final files.

3. The method of claim 1, wherein any auxiliary files are built from the single source file, the method further comprising the step of processing any auxiliary files to rename the auxiliary files and to correct information contained therein so as to maintain an accurate logical association between the auxiliary file(s), the final files associated with the auxiliary file(s), and the source file.

4. The method of claim 1, further comprising the step of directing the plurality of final files to depend upon the corresponding rules file.

5. The method of claim 1, wherein step h is performed though an "include" directive.

6. A computer program product for constructing a makefile for a complying build tool from a core makefile and other files to direct a plurality of final files to be built from a single source file, the computer program product having a medium with a computer program embodied thereon, the computer program comprising:
    a) computer program code for obtaining a list of rules files, each rules file corresponding to one of the plurality of final files;
    b) computer program code for deriving from the list of rules files a list corresponding to the plurality of final files;
    c) computer program code for requiring that the makefile be rebuilt if the list created in step b has changed since the makefile was last built;
    d) computer program code for having the makefile depend upon the rules files and the core makefile;
    e) computer program code for deriving from the rules files rules specific to each corresponding final file, and including the rules in the makefile;
    f) computer program code for directing each final file to be built by calling a file processing tool with option(s) specific to each final file;
    g) computer program code for determining whether files containing dependency information for the final files are available;
    h) computer program code for, upon a determination that the files containing dependency information for the final files are available, including the files containing dependency information for the final files, the dependency information being reported by the file processing tool;
    i) computer program code for ensuring that any given final file will be considered out-of-date if there is no dependency information available for the given final file; and
    j) computer program code for regenerating the files containing the dependency information only if the corresponding final file is being made.

7. The computer program product of claim 6, wherein each rules file corresponds by name to one of the final files.

8. The computer program product of claim 6, wherein any auxiliary files are built from the single source file, the method further comprising the step of processing any auxiliary files to rename the auxiliary files and to correct information contained therein so as to maintain an accurate logical association between the auxiliary file(s), the final files associated with the auxiliary file(s), and the source file.

9. The computer program product of claim 6, further comprising computer program code for directing the plurality of final files to depend upon the corresponding rules file.

10. The computer program product of claim 6, wherein computer program code h further comprises computer program code for using an "include" directive.

11. A Computer system for constructing a makefile for a complying build tool from a core makefile and other files to direct a plurality of final files to be built from a single source file, the system comprising:
   a) means for obtaining a list of rules files, each rules file corresponding to one of the plurality of final files;
   b) means for deriving from the list of rules files a list corresponding to the plurality of final files;
   c) means for requiring that the makefile be rebuilt if the list created in step b has changed since the makefile was last built;
   d) means for having the makefile depend upon the rules files and the core makefile;
   e) means for deriving from the rules files rules specific to each corresponding final file and including the rules in the makefile;
   f) means for directing each final file to be built by calling a file processing tool with option(s) specific to each final file;
   g) means for determining whether files containing dependency information for the final -files are available;
   h) means for, upon a determination that the files containing dependency information for the final files are available, including the files containing dependency information for the final files, the dependency information being reported by the file processing tool;
   i) means for ensuring that any given final file will be considered out-of-date if there is no dependency information available for the given final file; and
   j) means for regenerating the files containing the dependency information only if the corresponding final file is being made.

12. The system of claim 11, wherein each rules file corresponds by name to one of the final files.

13. The system of claim 11, wherein any auxiliary files are built from the single source file, the method further comprising the step of processing any auxiliary files to rename the auxiliary files and to correct information contained therein so as to maintain an accurate logical association between the auxiliary file(s), the final files associated with the auxiliary file(s), and the source file.

14. The system of claim 11, further comprising means for directing the plurality of final files to depend upon the corresponding rules file.

15. The system of claim 11, wherein means h further comprises means for using an "include" directive.

* * * * *